Oct. 11, 1932.                C. KIRCHNER                 1,881,672
               METHOD OF MAKING SPRING STRUCTURES
                       Filed July 11, 1931
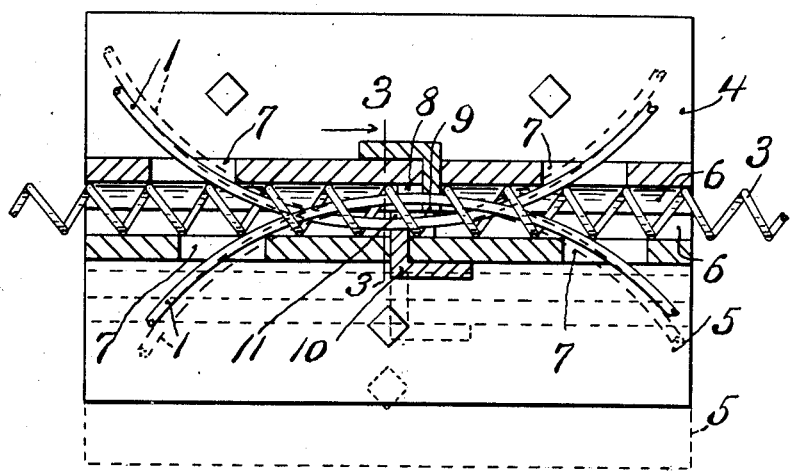
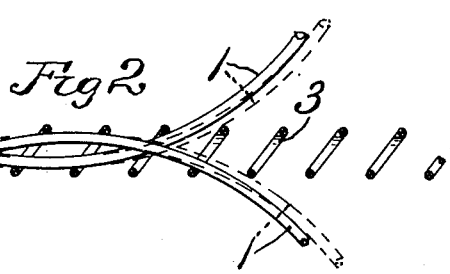
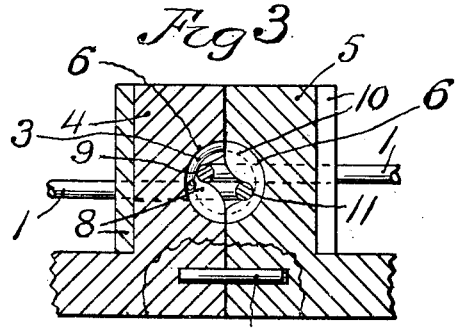
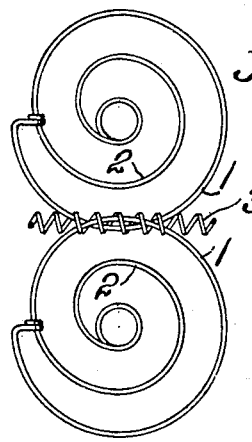
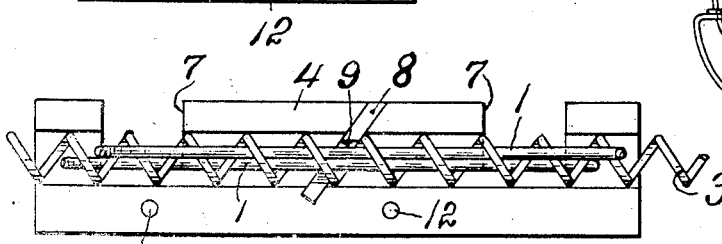
                                              INVENTOR
                                           Carl Kirchner
                                           Warren D. House
                                              His ATTORNEY
Witness
H. Vernon Olson Patented Oct. 11, 1932

1,881,672

UNITED STATES PATENT OFFICE

CARL KIRCHNER, OF CARTHAGE, MISSOURI, ASSIGNOR TO LEGGETT AND PLATT SPRING BED AND MANUFACTURING COMPANY, OF CARTHAGE, MISSOURI, A CORPORATION OF MISSOURI

METHOD OF MAKING SPRING STRUCTURES

Application filed July 11, 1931. Serial No. 550,176.

My invention relates to methods of making spring structures.

One of the objects of my invention is the provision of a novel method of connecting two coils of two coil springs with a helical in a manner such that the coils will be held firmly to each other and to the helical, thus eliminating looseness and squeaking in the assembled structure.

The novel features of my invention are hereinafter fully described and claimed.

In the accompanying drawing which illustrates my improved coil spring connection and a portion of an apparatus for carrying my improved method into effect.

Fig. 1 is a horizontal sectional view of two clamping and helical guiding jaws and portions of two coils of two springs and a connecting helical mounted between said jaws.

Fig. 2 is a view, partly in plan and partly in horizontal section of two crossed portions of two spring coils and a helical connecting them.

Fig. 3 is a section on the line 3—3 of Fig. 1.

Fig. 4 is an inside elevation of one of the clamping jaws with portions of two spring coils and a helical mounted therein.

Fig. 5 is a reduced top view of two coil springs as connected by a helical by my improved method.

Similar characters of reference designate similar parts in the different views.

In carrying my improved method into effect two portions 1 of two end coils of two spiral springs 2 are crossed and expanded, as shown by solid lines in Fig. 1 and in dotted lines in Fig. 2. While said portions 1 are held expanded, a helical, 3, preferably of spring wire, of the proper diameter and of the desired lead, is screwed into encircling engagement with the expanded portions 1, after which the portions 1 are permitted to contract to the position shown in dotted lines in Fig. 1 and in solid lines in Fig. 2. Such contraction of the portions 1 will compress the encircling coils of the helical 3 and will cause them to tightly bind against the portions 1 at the end and intermediate encircling coils of the helical. The same helical coils will embrace both portions 1.

The coil springs 2 will thus be firmly held together and to the helical, thus eliminating looseness and squeaking.

In the apparatus shown, there are two co-operating clamping and guiding jaws 4 and 5 having on their inner sides respectively two longitudinal grooves 6 which register with each other and form a guiding and holding channel for receiving the portions 1 and the helical 3.

The jaw 5 is slidable from the closed position shown in solid lines in Fig. 1 to an open position, shown in dotted lines in Fig. 1, in which latter position, the coil portions 1 may be inserted into the grooves 6.

Each jaw 4 and 5 is provided with two slots 7 communicating with the grooves 6 respectively for receiving the coil portions 1. Each jaw has its slots 7 so spaced apart that the coil portion 1 which is to be inserted therein must be expanded from its initial size, as shown in dotted lines in Fig. 1 and in solid lines in Fig. 2, to the position shown in solid lines in Fig. 1 and in dotted lines in Fig. 2.

For properly guiding the helical 3 in the grooves 6 into encircling engagement with the portions 1 which are in the grooves 6, and for properly locating the portions 1 in said grooves 6, there is provided in the jaw 4 extending across its groove 6 an inclined guiding plate 8, Figs. 1 and 4, having a notch 9, Fig. 3, for receiving the lower portion 1. A similar guiding and spacing plate 10 is provided in the jaw 5 across its groove 6, said plate 10 having an edge notch 11 for receiving the upper portion 1.

Pins 12 mounted in the inner side of the jaw 4 slidably fit in holes provided therefor in the inner side of the jaw 5, for holding the jaws 4 and 5 in proper register in the closed position.

In the operation of the apparatus, the jaw 5 is moved by any suitable means to the open position, shown in dotted lines in Fig. 1, after which the bottom portion 1 is mounted in the slots 7 of the jaw 5. The upper portion 1 is then mounted in the slots 7 of the jaw 4. The jaw 5 is then moved to the closed position shown in solid lines in Figs. 1 and 3. The portions 1 will thus be expanded and firmly held by the plates 8 and 10 spaced from the walls of the grooves 6.

The helical 3 is then inserted into the grooves 6 and turned by hand or by any suitable mechanical means in a direction such that it will be screwed into encircling engagement with the portions 1, the same coils of the helical encircling both portions 1. By expanding the portions 1 and holding them expanded while the helical is being screwed into encircling engagement therewith, the helical can be easily screwed and a maximum number of coils thereof caused to encircle the portions 1.

The helical having been thus screwed into engagement with the portions 1, the jaw 5 is moved to the open position, and the portions 1 and helical 3 are removed from between the jaws.

The portions 1, thus being released will contract so as to compress the encircling coils of the helical 3, and the latter will tightly bind together the portions 1, the parts then being as shown in solid lines in Fig. 2. The portions 1 will thus compress endwise the coils of the helical 3 and will be held thereby tightly, thereby avoiding looseness and squeaking in the use of coils so connected. By expanding the coils, a larger number of the coils of a helical will be caused to encircle the coils than where the helical is screwed into engagement with the coils not so expanded.

Instead of expanding portions of the coils 1 prior to screwing the helical into engagement therewith, portions of said coils may be contracted. In such case the clamping and guiding jaws 4 and 5 would have their slots 7 disposed as shown in dotted lines, Fig. 1, so that when the portions 1 are inserted they would occupy the contracted positions shown in dotted lines in Fig. 1 and in solid lines in Fig. 2.

The helical 3 would then be screwed into encircling engagement with the contracted portions 1, the same coils of the helical encircling both of said contracted portions. The jaw 5 would then be moved to the open position, shown in dotted lines in Fig. 1, thus releasing the coils and the helical, upon which the portions 1, which had been placed under tension, by being contracted, would become relaxed, and would assume the shape they had prior to being contracted, such as is indicated by solid lines in Fig. 1 and in dotted lines in Fig. 2.

The portions 1 in thus relaxing and expanding would cause the coils of the helical 3 to tightly embrace them and they would in turn be expanded lengthwise by the expanded portions 1, whereby the portions 1 and the helical would be firmly held together.

Various modifications of my invention, within the scope of the appended claims, may be made without departing from the spirit thereof.

What I claim is:—

1. The method consisting in crossing and expanding two portions respectively of two coils of two springs and, while holding said portions expanded, screwing into encircling engagement therewith, between their crossing points, a helical the same coils of which encircle both of said portions, and then permitting said portions to contract into binding engagement with said helical.

2. The method consisting in crossing and expanding two portions respectively of two coils of two springs and, while holding said portions expanded, screwing into encircling engagement therewith, between their crossing points, the same coils of a helical of a number and diameter such that when said portions are permitted to contract the end ones of the encircling coils will be forced toward each other and said encircled portions will be tightly bound thereby, and then permitting said portions to contract.

3. The method consisting in crossing and springing into a state of tension two portions respectively of two coils of two springs, and, while holding said portions in said state of tension, screwing into encircling engagement therewith, between their crossing points, a helical the same coils of which encircle both of said portions, and then permitting said portions to relax into tight engagement with said helical.

4. The method consisting in crossing and springing into a state of tension two portions respectively of two coils of two springs, and, while holding said portions in said state of tension, screwing into encircling engagement therewith, between their crossing points, a helical the same coils of which encircle both of said portions, and then permitting said portions to relax, the diameter and disposition of the encircling coils being such that, when said portions are relaxed, the encircling coils will tightly embrace said portions and in turn will be placed under lengthwise tension by said portions.

In testimony whereof I affix my signature.

CARL KIRCHNER.